(12) United States Patent
Matyas, Jr. et al.

(10) Patent No.: US 7,010,689 B1
(45) Date of Patent: Mar. 7, 2006

(54) SECURE DATA STORAGE AND RETRIEVAL IN A CLIENT-SERVER ENVIRONMENT

(75) Inventors: Stephen Michael Matyas, Jr., Manassas, VA (US); Mohammad Peyravian, Morrisville, NC (US); Allen Leonid Roginsky, Durham, NC (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 09/642,878

(22) Filed: Aug. 21, 2000

(51) Int. Cl.
*H04L 9/00* (2006.01)

(52) U.S. Cl. .................... 713/168; 713/160
(58) Field of Classification Search ............. 713/168
See application file for complete search history.

(56) References Cited

U.S. PATENT DOCUMENTS

| | | | |
|---|---|---|---|
| 4,238,854 A | 12/1980 | Ehrsam et al. ............... 375/2 |
| 4,757,533 A | 7/1988 | Allen et al. ................. 380/25 |
| 5,150,407 A | 9/1992 | Chan ........................ 380/4 |
| 5,235,641 A | 8/1993 | Nozawa et al. .............. 380/21 |
| 5,495,533 A * | 2/1996 | Linehan et al. ............. 713/155 |
| 5,499,298 A | 3/1996 | Narasimhalu et al. ........ 380/25 |
| 5,563,946 A | 10/1996 | Cooper et al. ............... 380/4 |
| 5,638,448 A * | 6/1997 | Nguyen ...................... 380/29 |
| 5,699,428 A | 12/1997 | McDonnal et al. ........... 380/4 |
| 5,719,941 A | 2/1998 | Swift et al. ................. 380/25 |
| 5,734,819 A * | 3/1998 | Lewis ........................ 713/200 |
| 5,751,814 A | 5/1998 | Kafri ......................... 380/49 |
| 5,787,169 A | 7/1998 | Eldridge et al. ............. 380/4 |
| 5,805,712 A * | 9/1998 | Davis ........................ 713/173 |
| 5,841,871 A | 11/1998 | Pinkas ....................... 380/25 |
| 5,995,624 A | 11/1999 | Fielder et al. ............... 380/25 |
| 6,011,847 A | 1/2000 | Follendore, III ............. 380/4 |
| 6,023,506 A * | 2/2000 | Ote et al. .................... 713/165 |
| 6,105,131 A | 8/2000 | Carroll ...................... 713/155 |
| 6,678,731 B1 | 1/2004 | Howard et al. .............. 709/225 |

OTHER PUBLICATIONS

Applied Cryptography, Bruce Schneier, 1996, pp. 174, 31.*
Konheim, Allen G. "*Cryptography, A Primer*," pp. 348-363 (1981).
Steiner et al. *Kerberos: An Authentication Service For Open Network Systems*, Jan. 12, 1988.
Schneier, Bruce, *Applied Cryptography: Protocols, Algorithms, and Source Code in C*, pp. 51-55 and 417-425 (Dec. 1995).

* cited by examiner

*Primary Examiner*—Gregory Morse
*Assistant Examiner*—Christopher J Brown
(74) *Attorney, Agent, or Firm*—Myers Bigel Sibley & Sajovec; Jerry W. Herndon

(57) ABSTRACT

Methods, systems and computer program products are provided for controlling access to digital data in a file by obtaining a passphrase from a user and generating a personal key based on the obtained passphrase. A file encryption key is generated and the digital data in the file encrypted with the file encryption key to provide an encrypted file. The file encryption key is encrypted with the personal key to provide an encrypted file encryption key. A file header containing the encrypted file encryption key and associated with the encrypted file. The encrypted file and the file header associated with the encrypted file may be stored at a file server.

9 Claims, 12 Drawing Sheets

SECURE DATA STORAGE AND RETRIEVAL IN A CLIENT-SERVER ENVIRONMENT

RELATED APPLICATIONS

The present application is related to U.S. patent application Ser. No. 09/642,879, entitled "SECURE DATA STORAGE AND RETRIEVAL WITH KEY MANAGEMENT AND USER AUTHRNTIACATION", the disclosure of which is incorporated by reference as if set forth fully herein.

FIELD OF THE INVENTION

The present invention relates to data processing systems and more particularly to the security of stored digital data.

BACKGROUND OF THE INVENTION

With an ever increasing awareness among the public as to the privacy of digitally stored data, much attention has been focused on mechanisms for providing secure files and/or file access. Such security may become ever more important as, for example, more and more information is stored in a "file server" format. For example, with the recent introduction of publicly accessible "Internet hard disks" where files of many different, and often unrelated, users are stored on Internet accessible servers, the issue of file security may become even more important. As is evidenced by, for example, the systems identified below, many differing solutions have been proposed to the problem of file security.

One conventional file security system is described in Allen G. Konheim, *Cryptography, A Primer*, John Wiley & Sons, New York, 1981, pp. 348–363, describes a file security system called the Information Protection System (IPS). In IPS, each user has a secret passphrase, which is hashed by the system to produce a file encryption key. The file encryption key is then used to encrypt/decrypt that user's files. The encrypted files for all users are stored in a common system database. Each enciphered file has a file header. The file header contains such information as the type of encipherment used, a time-date stamp, the version of IPS employed, cryptographic chaining information and a key verification field, but it contains no encrypted key field, since IPS uses only a 1-level key management system.

Additional security systems are described in U.S. Pat. Nos. 4,238,854, 4,757,533, 5,150,407, 5,235,641, 5,495,533, 5,563,946, 5,699,428, 5,719,941, 5,751,814, 5,787,169, 5,841,871, 6,011,847 and 6,023,506.

SUMMARY OF THE INVENTION

Embodiments of the present invention include methods, systems and computer program products which provide for controlling access to digital data in a file by obtaining a passphrase from a user and generating a personal key based on the obtained passphrase. A file encryption key is generated and the digital data in the file encrypted with the file encryption key to provide an encrypted file. The file encryption key is encrypted with the personal key to provide an encrypted file encryption key. A file header containing the encrypted file encryption key is created and associated with the encrypted file. The encrypted file and the file header associated with the encrypted file may be stored at a file server.

In further embodiments of the present invention, the passphrase comprises a current passphrase and may be changed to a new passphrase. The file header associated with the encrypted file is retrieved from the file server and the personal key is generated from the current passphrase associated with the file. The encrypted file encryption key is decrypted with the personal key to provide a recovered file encryption key. A new personal key is generated based on the new passphrase and the file encryption key encrypted with the new personal key to provide a new encrypted file encryption key. A new file header containing the new encrypted file encryption key is generated, associated with the file and stored at the file server. In further embodiments, a plurality of files may utilize the same passphrase and one or more of the plurality of files may have their passphrases changed to the new passphrase. In particular embodiments, all files stored at the file server associated with a user and having a file header with an encrypted file encryption key encrypted with a personal key derived from the current passphrase may be changed to the new passphrase.

In further embodiments, the file may be decrypted by obtaining a passphrase to be utilized in decrypting the file. The encrypted file and the associated file header are retrieved from the file server. The personal key is generated from the passphrase to be utilized in decrypting the file and the encrypted file encryption key decrypted with the personal key to provide a recovered file encryption key. The file may then be decrypted with the recovered file encryption key.

In still further embodiments of the present invention, a user identification associated with an owner of the file is obtained. A file identification associated with the file is also obtained. In such embodiments, a personal key based on the obtained passphrase may be generated by hashing the user identification, the passphrase and the file identification to provide the personal key.

Furthermore, the file and the file header may be selectively stored at the file server based on a type of store requested by the user and an evaluation of whether an existing file and file header having the user identification and file identification are stored at the file server.

In still further embodiments of the present invention, an integrity key is generated. A message authentication code is generated based on digital data of the file utilizing the integrity key. The file encryption key and the integrity key are encrypted with the personal key to provide encrypted file encryption keys. The file header containing the encrypted file encryption key is created containing the encrypted file encryption keys and the message authentication code.

To decrypt the file a passphrase to be utilized in decrypting the file is obtained. The encrypted file and the associated file header are retrieved from the file server. The personal key is generated from the passphrase to be utilized in decrypting the file. The encrypted file encryption keys are decrypted with the personal key to provide a recovered file encryption key and a recovered integrity key and the file decrypted with the recovered file encryption key. The recovered integrity key is hashed with the decrypted file to provide a recovered message authentication code which is compared with a message authentication code from the file header to confirm that the decrypted file corresponds to the file which generated the message authentication code from the file header.

Furthermore, the file encryption key may be hashed with the integrity key to provide a verification value. The file encryption key, the integrity key and the verification value are then encrypted with the personal key to provide the encrypted file encryption keys. Decryption of the file may then further include hashing the recovered file encryption key and the recovered integrity key to provide a hash value. The hash value and the recovered verification value may be compared and the file decrypted with the recovered file encryption key if the comparison of the hash value and the recovered verification value indicates that the values are equal.

In additional embodiments of the present invention, it may be determined if a party other than an owner of the file is to have access to the file. A public key associated with the party other than the owner of the file is obtained and the file encryption key encrypted with the public key of the party other than the owner of the file to provide a public key encrypted file encryption key. The public key encrypted file encryption key may be incorporated in the header associated with the file if the party other than the owner of the file is to have access to the file.

In such embodiments, the file may be decrypted by retrieving the file and the file header from the file server and obtaining a private key associated with the public key. The public key encrypted file encryption key is decrypted with the private key to provide the file encryption key and the file decrypted with the file encryption key. In further embodiments, an integrity key may be generated and a message authentication code generated based on digital data of the file utilizing the integrity key. The file encryption key and the integrity key are encrypted with the public key to provide encrypted file encryption keys and a file header containing the encrypted file encryption keys and the message authentication code created. The integrity key and the file encryption key may also be hashed to provide an verification value which may also be encrypted with the public key and incorporated in the file header.

Furthermore, the public key may be changed by retrieving the file header, decrypting the file encryption keys with the personal key and re-encrypting the decrypted keys with the new public key.

While the invention has been described above primarily with respect to the method aspects of the invention, both systems and/or computer program products are also provided.

DETAILED DESCRIPTION OF PREFERRED EMBODIMENTS

Figure 1:
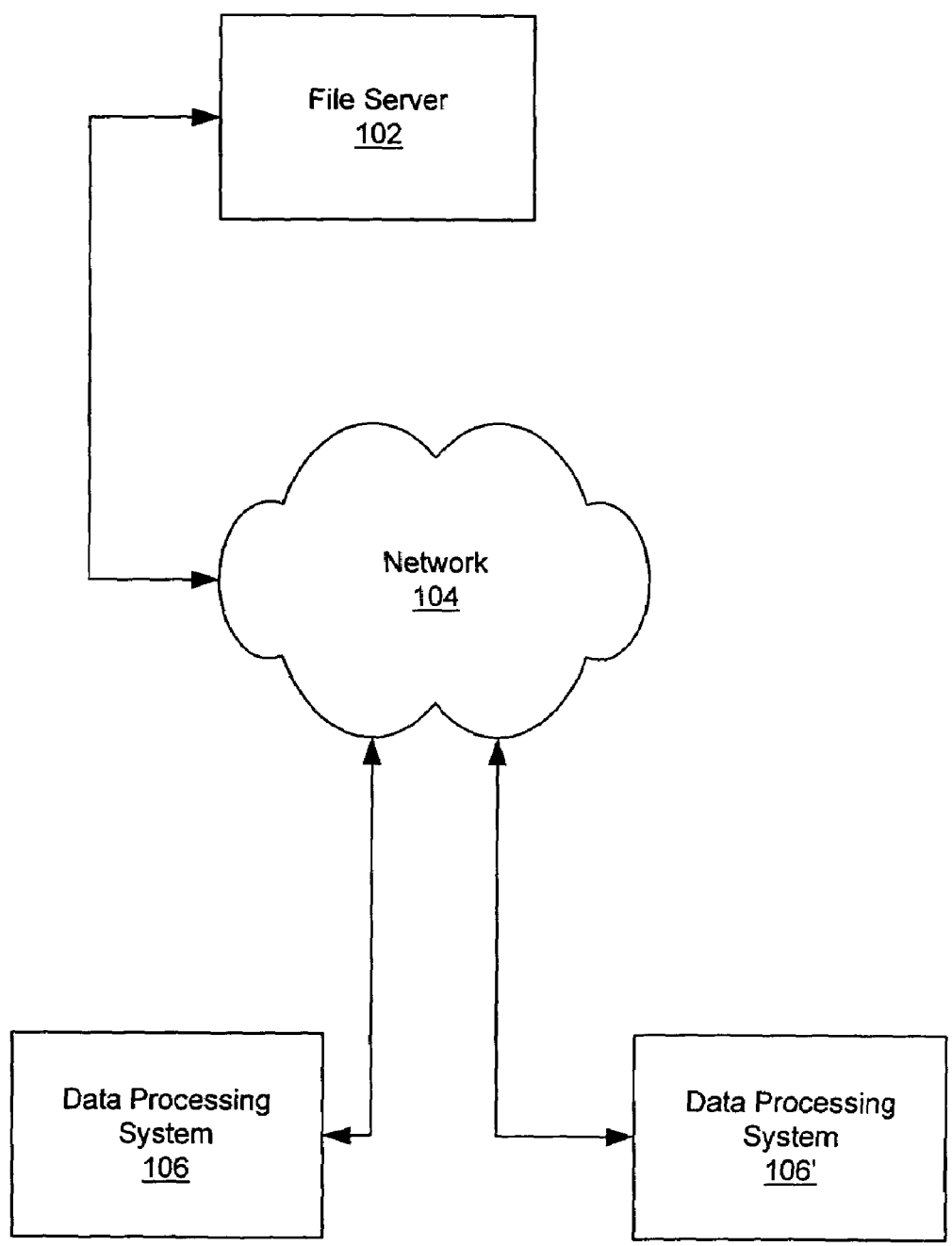
FIG. 1 is a block diagram of a system for encrypted file access according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention may provide for secure access to an encrypted file utilizing two-level encryption where a file is encrypted with a first key and where that key is encrypted with a second key generated from a password or passphrase associated with the file. As used herein, the terms password and passphrase are used interchangeably to refer to a value or sequence of values which may be provided by a user. The encrypted key may be stored in a header associated with the file and maintained on a server for access by a user. Additional embodiments of the present invention provide for storing, updating, retrieving and managing keys associated with users which have access to the file. Various embodiments of the present invention will now be described with reference to FIGS. 1 through 12.

Referring now to FIG. 1, a system for secure access to encrypted data according to embodiments of the present invention is illustrated. As seen in FIG. 1, a file server 102, which may store encrypted files and encrypted headers associated with the files, has access to a network 104. The network 104 may be an intranet, an extranet, a virtual private network, the Internet, a wireless network, a direct dial connection even a "sneaker" network where information is transmitted from processing system to processing system utilizing a removable storage media. Whatever the method of communication, the network 104 serves to provide communication between the file server 102 and client data processing systems 106 and 106' which may access the encrypted files and headers on the file server 102. As used herein, the terms client data processing system and client may be used interchangeably.

While systems according to embodiments of the present invention are illustrated as having a separate file server 102 and client data processing systems 106 and 106', as will be appreciated by those of skill in the art, such functions may be integrated into a single data processing system or may be distributed across multiple data processing systems. Furthermore, multiple file servers 102 may be accessed by a single or multiple client data processing systems 106 and 106. Additionally, while not illustrated in FIG. 1, multiple data processing systems may access one or more of the file server(s) 102 through one or more client data processing systems 106 and 106'. Thus, the client data processing systems 106 and 106' may act as servers and provide files to other data processing systems. Such a system may be beneficial where the file server 102 communicates with the client data processing systems 106 and 106' over an insecure network but where the other data processing systems may communicate with the client data processing systems 106 and 106' over a secure network, through a direct connection or through other such trusted communication media. In such a system, the client data processing systems 106 and 106' may act as a gateway between the trusted communication media and the insecure network. Thus, the present invention should not be construed as limited to the particular configuration illustrated in FIG. 1 but may be utilized with any configuration suitable for carrying out the operations described herein.

Figure 2:
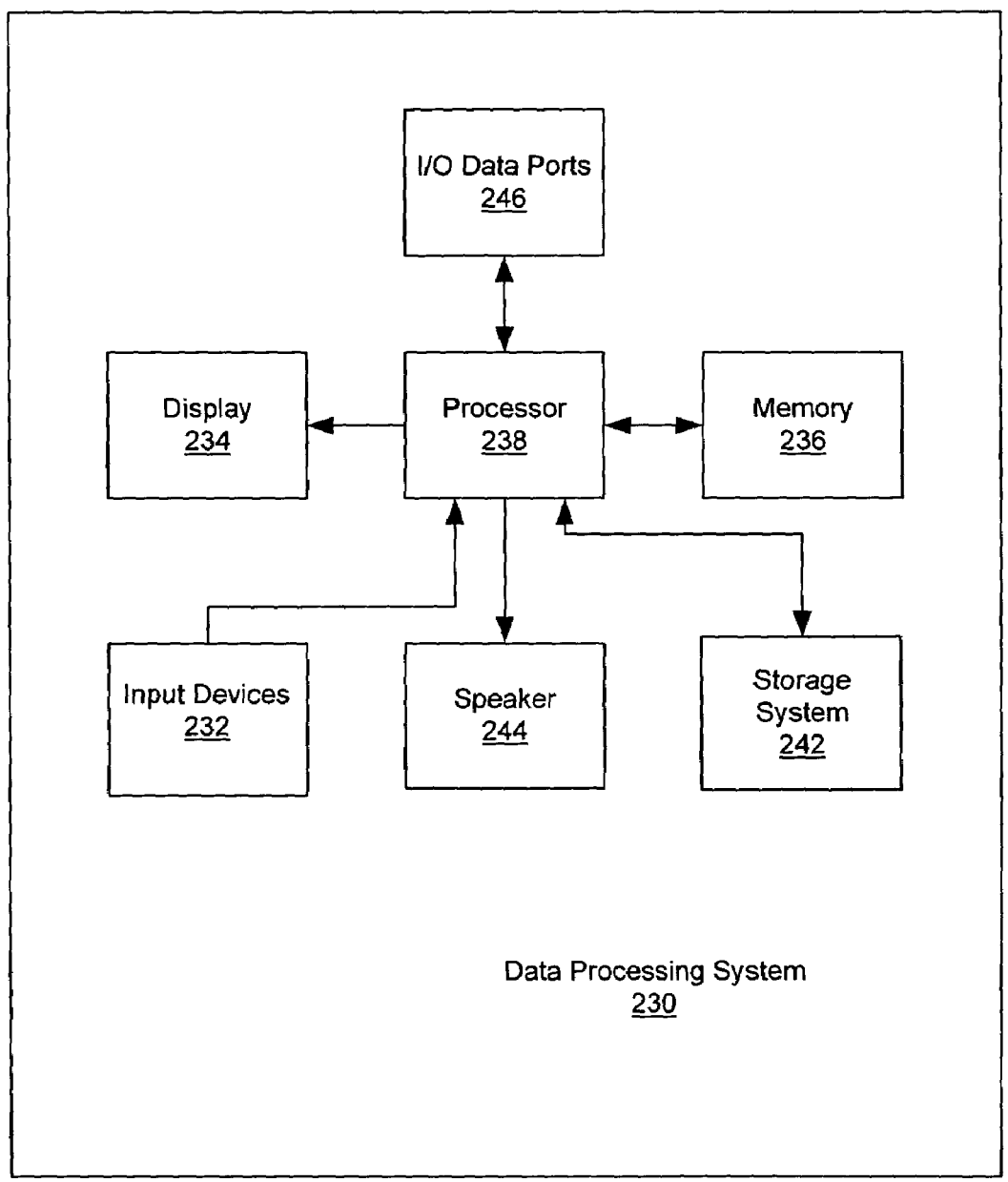
FIG. 2 is a block diagram of data processing systems according to embodiments of the present invention.

Referring now to FIG. 2, an exemplary embodiment of a data processing system 230 suitable for use as either a file server 102 or a client data processing system 106 and/or 106' in accordance with embodiments of the present invention is illustrated and may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
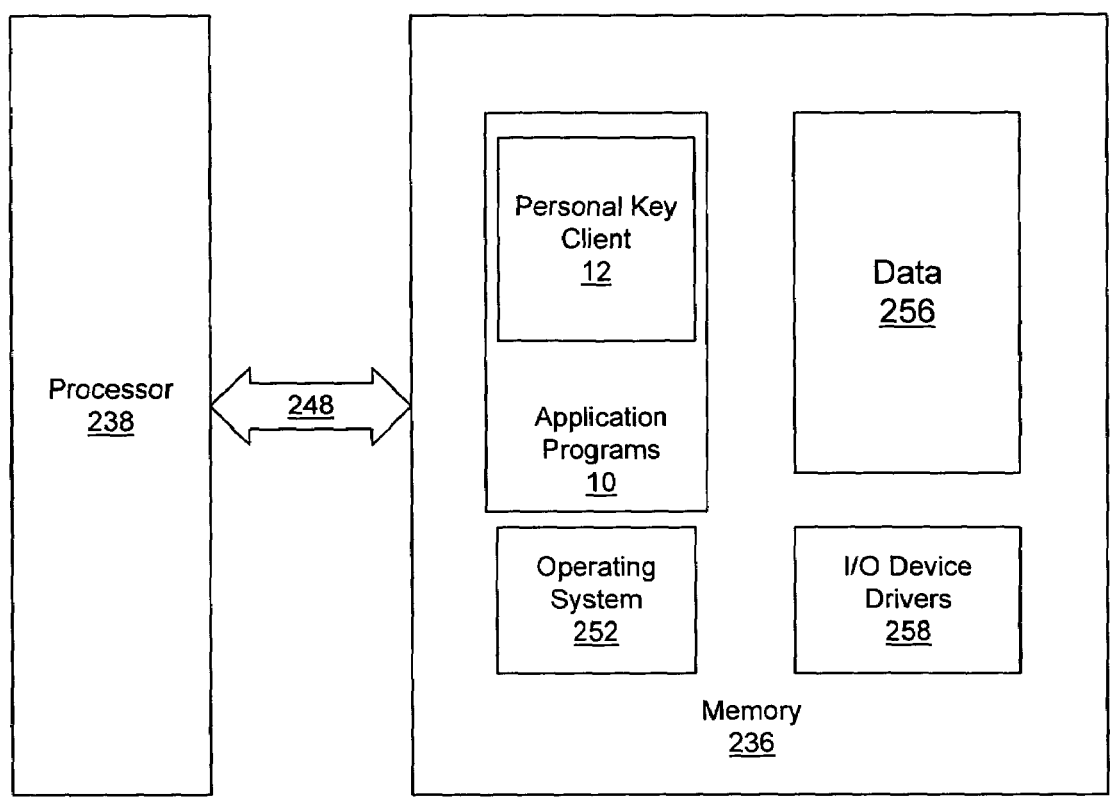
FIG. 3 is a more detailed block diagram of data processing systems according to embodiments of the present invention.

FIG. 3 is a block diagram of data processing systems that illustrate systems, methods, and computer program products in accordance with embodiments of the present invention. The processor 238 communicates with the memory 236 via an address/data bus 248. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may contain several categories of software and data used in the data processing system 230: the operating system 252; the application program(s) 10; the input/output (I/O) device drivers 258; and the data 256. As will be appreciated by those of skill in the art, the operating system 252 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 258 typically include software routines accessed through the operating system 252 by the application program 10 to communicate with devices such as the input devices 232, the display 234, the speaker 244, the storage system 242, the I/O data port(s) 246, and certain memory 236 components. The application program(s) 10 is illustrative of the programs that implement the various features of the data processing system 230. Finally, the data 256 represents the static and dynamic data used by the application program(s) 10, operating system 252, I/O device drivers 258, and other software programs that may reside in the memory 236.

As is further seen in FIG. 3, for client processing systems, the application program(s) 10 preferably includes a personal key client 12. The personal key client 12 may function as described herein for providing access to encrypted files. For server data processing systems, the application program 10 may, instead, include a file server module (not shown) which may store and control access to encrypted files and encrypted file headers as described herein.

While the present invention is illustrated, for example, with reference to a personal key client 12 and a file server which carries out the operations for software installation, as will be appreciated by those of skill in the art, the functions carried out by these modules may also be incorporated into for example, the operating system 252. Thus, the present invention should not be construed as limited to the configuration of FIG. 3 but is intended to encompass any configuration capable of carrying out the operations described herein.

Figure 4:
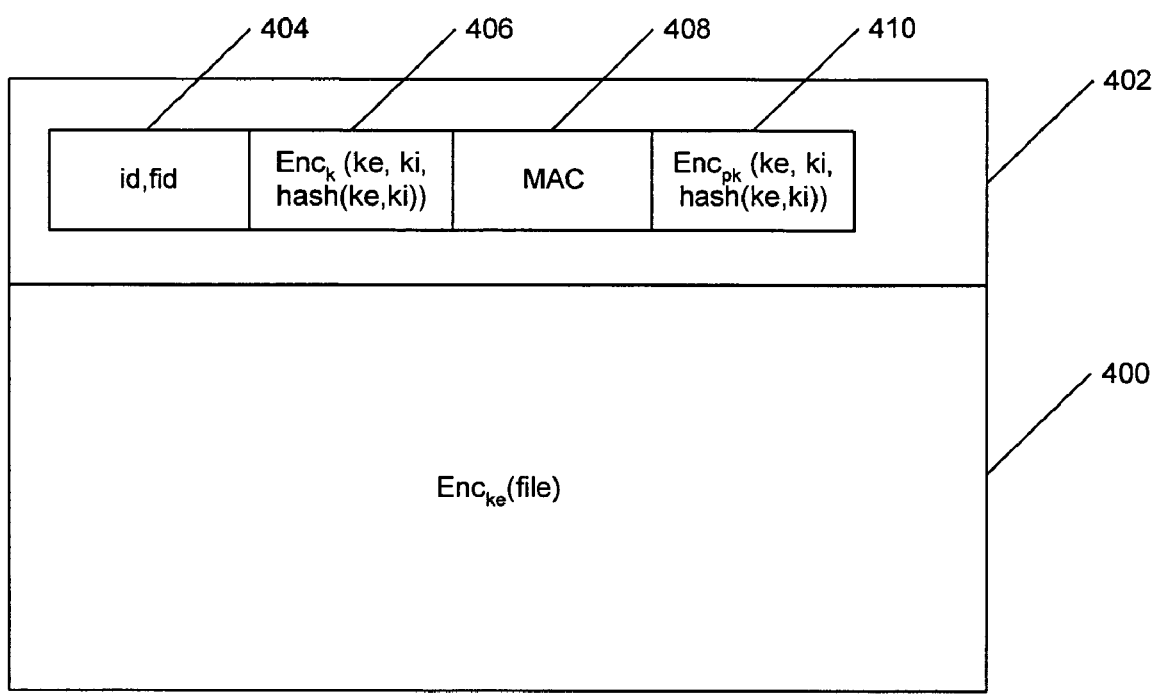
FIG. 4 is a block diagram of a file and file header according to embodiments of the present invention.

As briefly described above, in embodiments of the present invention, an encrypted file and an encrypted file header are associated with each other. FIG. 4 illustrates such an arrangement. As seen in FIG. 4, an encrypted file 400 may be a file which was encrypted with an encryption key ke and is illustrated in FIG. 4 as $ENC_{ke}$(file). An encrypted file header 402 is also provided. The file header 402 may contain both encrypted an unencrypted portions. As illustrated in FIG. 4, the file header may contain the tuple (id, fid) 404 where id is a user identification of an owner of the file and fid is a file identification associated with the file.

A file encryption key is stored in the file header 402 encrypted under a personal key k belonging to the user, derived from a user-supplied "passphrase/password." Such an encrypted file encryption key 406 is illustrated as $Enc_k$ (ke, ki, hash(ke, ki)) in FIG. 4. The file encryption key may also be encrypted with a public key or keys pk of one or more trusted third parties and incorporated in the file header 402 so as to allow third parties access to the file contents. Such an encrypted file encryption key 410 is illustrated as $Enc_{pk}$(ke, ki, hash(ke, ki)) in FIG. 4. A message authentication code (MAC) 408 may also be included within the file header 402 to verify the authenticity of the file after decryption. Therefore, a file can be decrypted by the user who created the encrypted file, and who has the "passphrase" needed to decrypt the file, and/or by a trusted third party that the creating-user has granted access to the file.

Embodiments of the present invention may provide a suitable file encryption solution, with relatively few components, at a correspondingly small cost, while at the same time being designed in such a way that additional system components can be layered "on top" of embodiments of the present invention, to provide enhanced user authentication with the capability for greater granularity of access control. Such additional enhancements are described in detail in commonly assigned and concurrently filed U.S. patent application Ser. No. 09/642,879, entitled "SECURE DATA STORAGE AND RETRIEVAL WITH KEY MANAGEMENT AND USER AUTHENTICATION", the disclosure of which is incorporated by reference as if set forth fully herein.

For access to the resources at the file server 102, the user may have a unique "userid" denoted by id. There can be any number of users but each user should have a unique userid (i.e., ID) with regard to the file encryption system. Each file that the user wants to store on the file server has a "fileid" denoted by fid. The fileids generated for a given userid should be unique with regard to a particular file system. The fileid may, for example, be generated from a file name provided by a user. However, fileids need not be unique across all users. Thus, the tuple (id, fid) uniquely identifies a single file on the file server 102 even though there might be many files on the file server 102 with the same fid. All the files on the file server belonging to a given userid (i.e., id) may be identified by the tuple (id, *) Similarly, less than all of the files could be identified for a user with various wildcard values for the fileid. A file may contain any form of digital data such as video, audio, text, etc.

The file server 102 may honor all requests for access to encrypted files. Thus, a user who requests a file from the file server 102, corresponding to tuple (id, fid) will be given the requested file if it exists and can be located. Thus, the file server 102 will typically not "screen" requests for files. Access to the unencrypted file is controlled via the file encryption key management system (i.e., via the encryption keys). However, the file server 102 does control requests to store encrypted files in the file server's database. Otherwise, an adversary could issue a request to the file server to store a file under a duplicate tuple (id, fid), thereby possibly causing duplicate files to be stored under the same tuple (id, fid). In addition, an adversary could cause unauthorized files to be stored under another user's id.

As is described in more detail below, for data protection, each user selects a "password" or "passphrase" denoted by pw. The password may be considered to be a secret value that only the user knows. The user password/passphrase is not stored by the system. As is further described below, the user may change their password/passphrase.

As described above, systems for user data storage and retrieval according to the present invention may be embodied as a personal key client resident in the user's personal computer and a file server where encrypted files are maintained within the system. Operations of the personal key client and the file server will now be described with reference to FIGS. 5 through 12.

The operations for file management illustrated in FIGS. 5 through 12 may provide core functions which provide for the control of encrypted files. Thus, as will be appreciated by those of skill in the art in light of the present disclosure, these core functions may be further manipulated to provide additional file management functions. For example, a rename file operation could be associated with a file by retrieving the file and storing the file with the new file name. Optionally, the old file could be overwritten, deleted, or marked as inaccessible. Similarly, third party access to files and file ownership may be changed through the retrieval, storage and password or key change operations. Thus, for example, to change which users are trusted third party's, the public key operations described below could be utilized to replace one third parties party's public key with another's and, thereby, provide access to file to a different third party. Similarly, file ownership could be changed by allowing the new owner third party access to the file, the new owner could retrieve the file and store the file under a new tuple (id, fid) and, thereby, obtain ownership of the file. Thus, the core functions described herein may provide a robust feature set which may be readily expanded through combinations of operations. Furthermore, additional "file management" functions could also be incorporated, for example, utilizing conventional file server operations.

Figure 5:
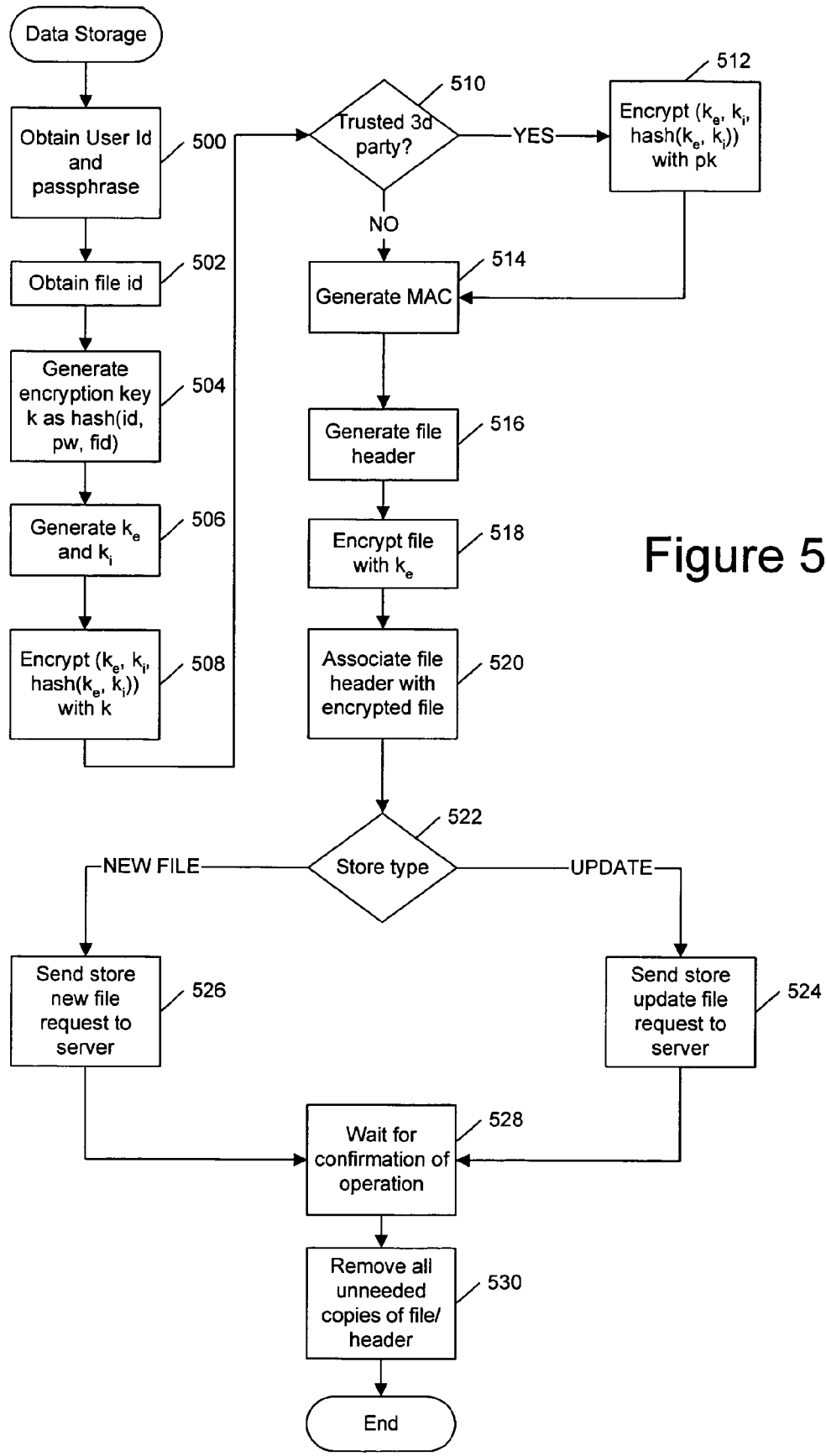
FIG. 5 is a flowchart illustrating operations of a client of an owner of a file for creating or updating an encrypted file according to embodiments of the present invention.
Figure 6:
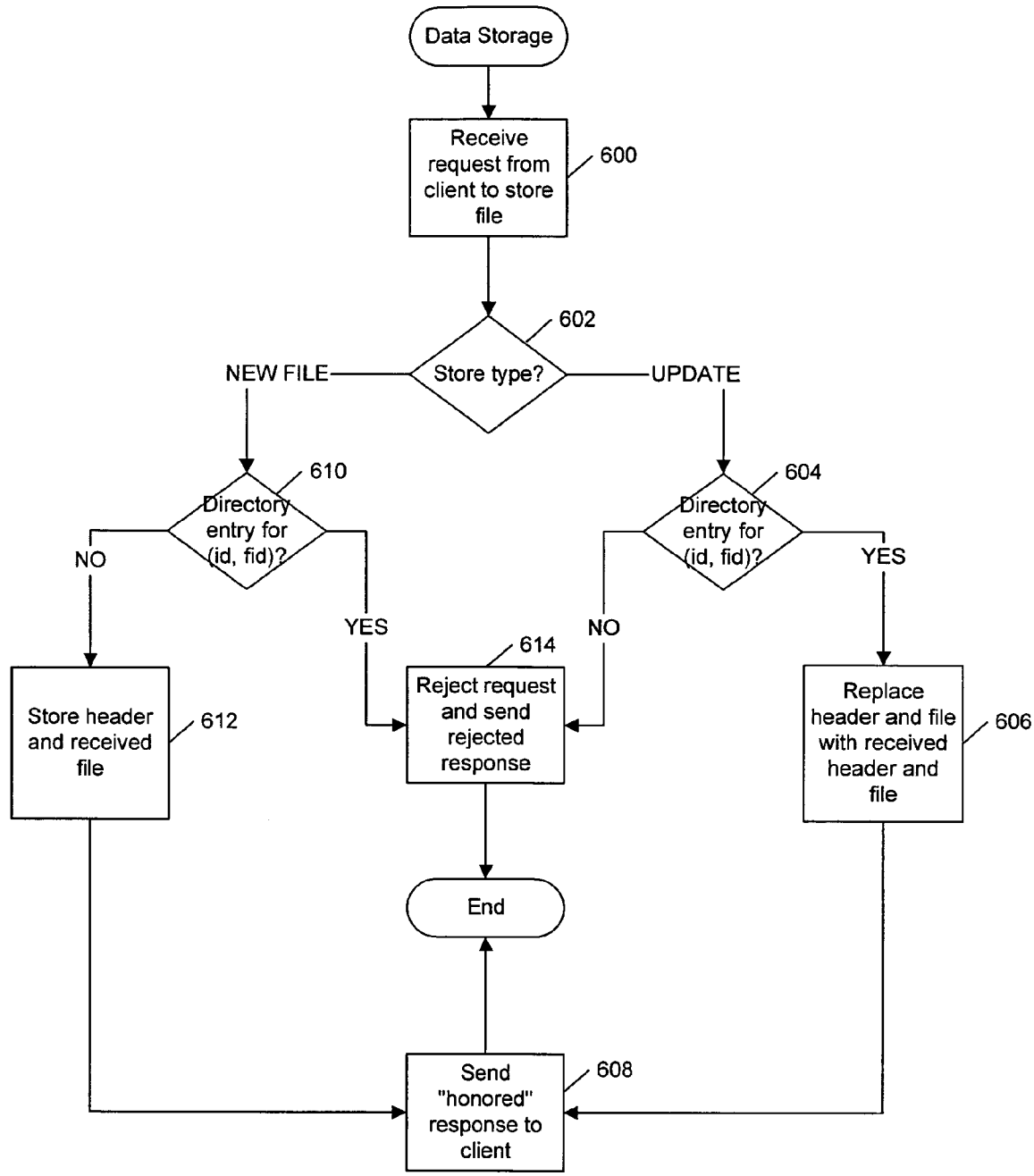
FIG. 6 is a flowchart illustrating operations of a server for creating or updating an encrypted file according to embodiments of the present invention.

Data storage operations according to embodiments of the present invention will now be described with reference to FIGS. 5 and 6. FIG. 5 illustrates operations of a personal key client for data storage. FIG. 6 illustrates operations of the file server for data storage.

As seen in FIG. 5, when a user wants to encrypt a file and store the encrypted file on the file server, the user submits their userid (id) and password/passphrase (pw) to the personal key client (block 500). The user (or the personal key client) may pick a unique fileid (i.e., fid) for the file to be stored on the file server (block 502). The fileid may be based on a file name provided by the user. For example, the fileid may be the file name or may be generated from the file name.

The personal key client generates a key encrypting key k (block 504) based on the password/passphrase provided by the user. The key encrypting key k may be generated utilizing any suitable key generation technique, for example, the key may be generated as follows:

k=Hash(id, pw, fid)

The "Hash" function used here can be any strong collision-resistant one-way hash function such as SHA-1.

The personal key client also generates a random encryption key ke for encrypting the content of the file (block 506). Optionally, the personal key client generates a random integrity protection key ki for providing integrity protection on the content of the file (block 506). The encryption key ke and the integrity key ki may be generated utilizing any suitable random key generation technique. Such techniques are known to those of skill in the art and, therefore, will not be described further herein.

The personal key client encrypts ke, and, optionally, ki and a hash of ke, ki with k using, for example, a symmetric-key encryption algorithm (such as DES, Triple-DES, RC5, etc)(block 508). That is, $Enc_k$(ke, ki, Hash(ke, ki)).

The hash of ke, ki provides a verification value which may provide a way to do an integrity check on ke and ki when decrypted. The "Hash" function used here can be any strong collision-resistant one-way hash function such as SHA-1.

As is further illustrated in FIG. 5, optionally, the user may have the option to enable "file recovery by a trusted third party" in case, for example, they forget their password or if the file must be recoverable by a trusted third party. When this option is selected (block 510), the personal key client provides the public key (pk) of a trusted third party. Only the trusted third party with the corresponding secret key (sk) can decrypt any data encrypted with pk. When the "file recovery by a trusted third party" option is selected (block 510), the client encrypts ke, and optionally, ki and a hash of ke, ki with pk, for example, using an asymmetric-key encryption algorithm (such as RSA, Elliptic curve, etc)(block 512). That is, $Enc_{pk}$(ke, ki, Hash(ke, ki)).

As described above, the hash of ke, ki provides a way to do an integrity check on ke and ki when decrypted.

As a further option, the personal key client may generate a MAC (message authentication code) on the unencrypted content of the file (block 514). For example, the personal key client may utilize ki and a strong collision-resistant one-way hash function such as SHA-1 to generate the MAC. That is, MAC=Hash(file, ki). The personal key client may choose to split the file into pieces (e.g., piece$_1$, piece$_2$, . . . ) and compute the MAC for each piece individually. This allows data recovery to be done in pieces which may be useful for audio or video applications when data streaming is used.

The personal key client prepares a file header, which may contain, among other things, the applicable values (id, fid), $Enc_k$(ke, ki, Hash(ke, ki)), MAC, and $Enc_{pk}$(ke, ki, Hash(ke, ki)) (block 516) if provided in a particular embodiment. The personal key client also encrypts the content of the file with ke using a symmetric-key encryption algorithm (such as DES, Triple-DES, RC5, etc)(block 518). That is, $Enc_{ke}$(file). Again, the personal key client may choose to split the file into pieces (e.g., piece$_1$, piece$_2$, . . . ) and encrypt each piece individually. This may allow data recovery to be done in pieces which may be useful for audio or video applications when data streaming is used.

The personal key client next associates the file header with the encrypted file (block 520). The header associated with each file preferably accompanies the file in case the file is moved or renamed or backed-up. The header may be associated with the file in a number of ways. For example, the header may be stored as the first few bytes of the file, as a trailer at the end of the file, in the file's directory entry, in a separate area associated with the file's directory entry, in a local database or combinations thereof.

The personal key client determines if the type of storage operation, e.g., whether the operation is an update or the creation of a new file (block 522) and sends a "store new encrypted file" request (block 526) or a "store updated encrypted file" request (block 524) to the file server that includes the encrypted file, $Enc_{ke}$(file), and the file header. A "store new encrypted file" request indicates that the encrypted file is a new file to be stored under the tuple (id, fid), whereas a "store updated encrypted file" request indicates that the encrypted file is intended to replace an existing file currently stored under the tuple (id, fid). In either case, the personal key client waits for confirmation of the store request (block 528).

Turning now to FIG. 6, the operations of the file server may begin when the file server receives either the "store new encrypted file" or the "store updated encrypted file" requests (block 600). If a "store new encrypted file" request is received (block 602), the file server verifies that no directory entry exists for the tuple (id, fid) received in the "store new encrypted file" request (block 610). If no such directory entry exists, the file server creates a new file directory entry, it stores the file header in accordance with a predetermined one of the aforementioned techniques for associating the file header with the encrypted file, and it stores the received encrypted file in its database (block 612). Otherwise, the "store new encrypted file" request is rejected and a rejected response is sent to the client (block 614).

If a "store updated encrypted file" request is received (block 602), the file server verifies that a directory entry exists for the tuple (id, fid) received in the "store updated encrypted file" request (block 604). If such a directory entry exists, the file server replaces the current file header with the received file header, and it replaces the current encrypted file with the received encrypted file (block 606). Otherwise, the "store updated encrypted file" request is rejected and a rejected response sent to the client (block 614).

If, however, either of the store operations are successful, the file server sends a response message to the personal key client indicating that the "store new encrypted file" or "store updated encrypted file" request has been honored (block 608).

Returning to FIG. 5, when the personal key client receives the response from the file server (block 528), the personal key client deletes all the information associated with this file encryption operation from its memory/storage (i.e., keys, password/passphrase, encrypted information) (block 530). If the method for associating the file header with the encrypted file calls for the file header to be stored locally, in a local database, then the file header is so stored and only the working copy of the file header is deleted from its memory/storage. The nature of the response from the file server may also, optionally, be reported to the user.

Figure 7:
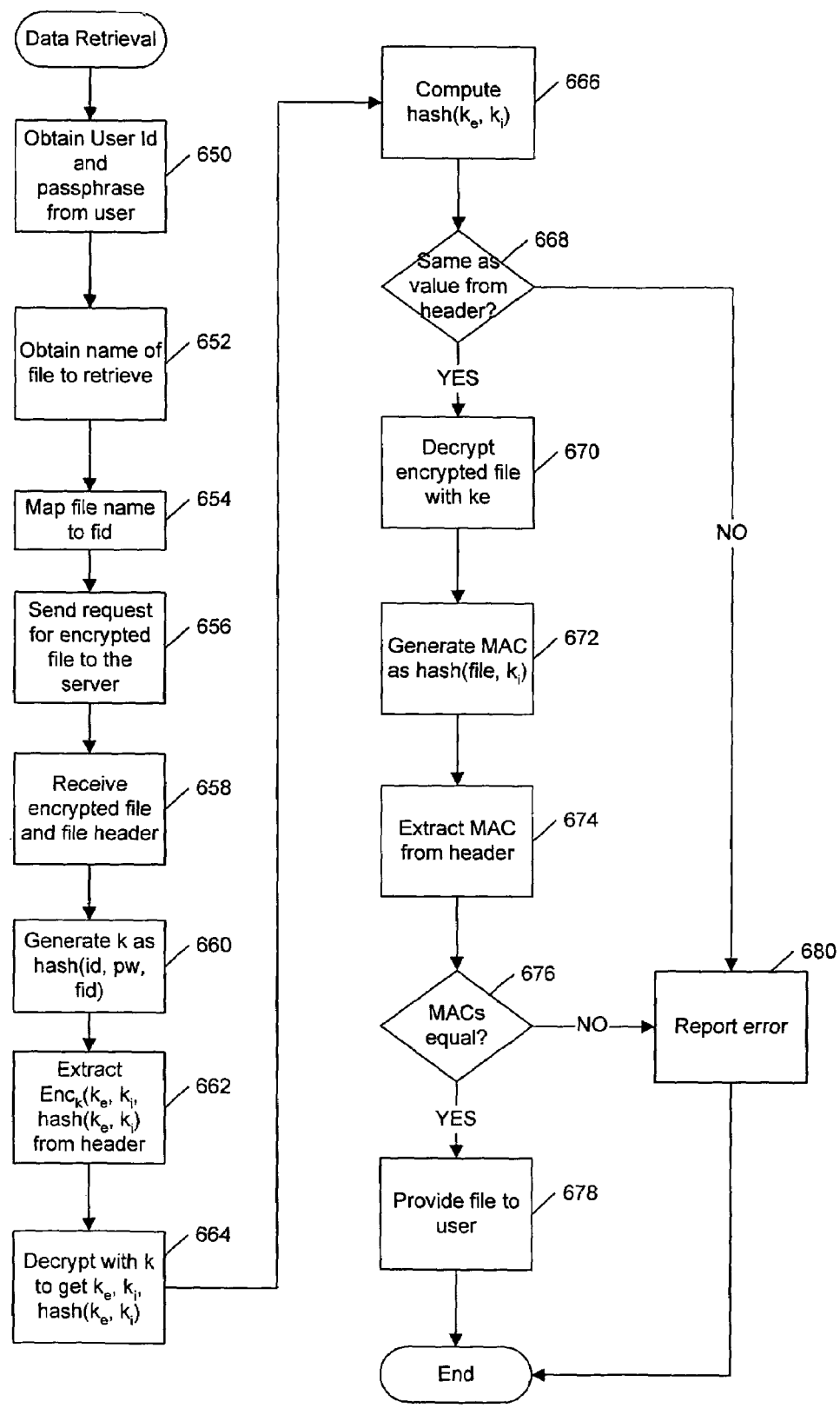
FIG. 7 is a flowchart illustrating operations of a client of an owner of a file for retrieving an encrypted file according to embodiments of the present invention.
Figure 8:
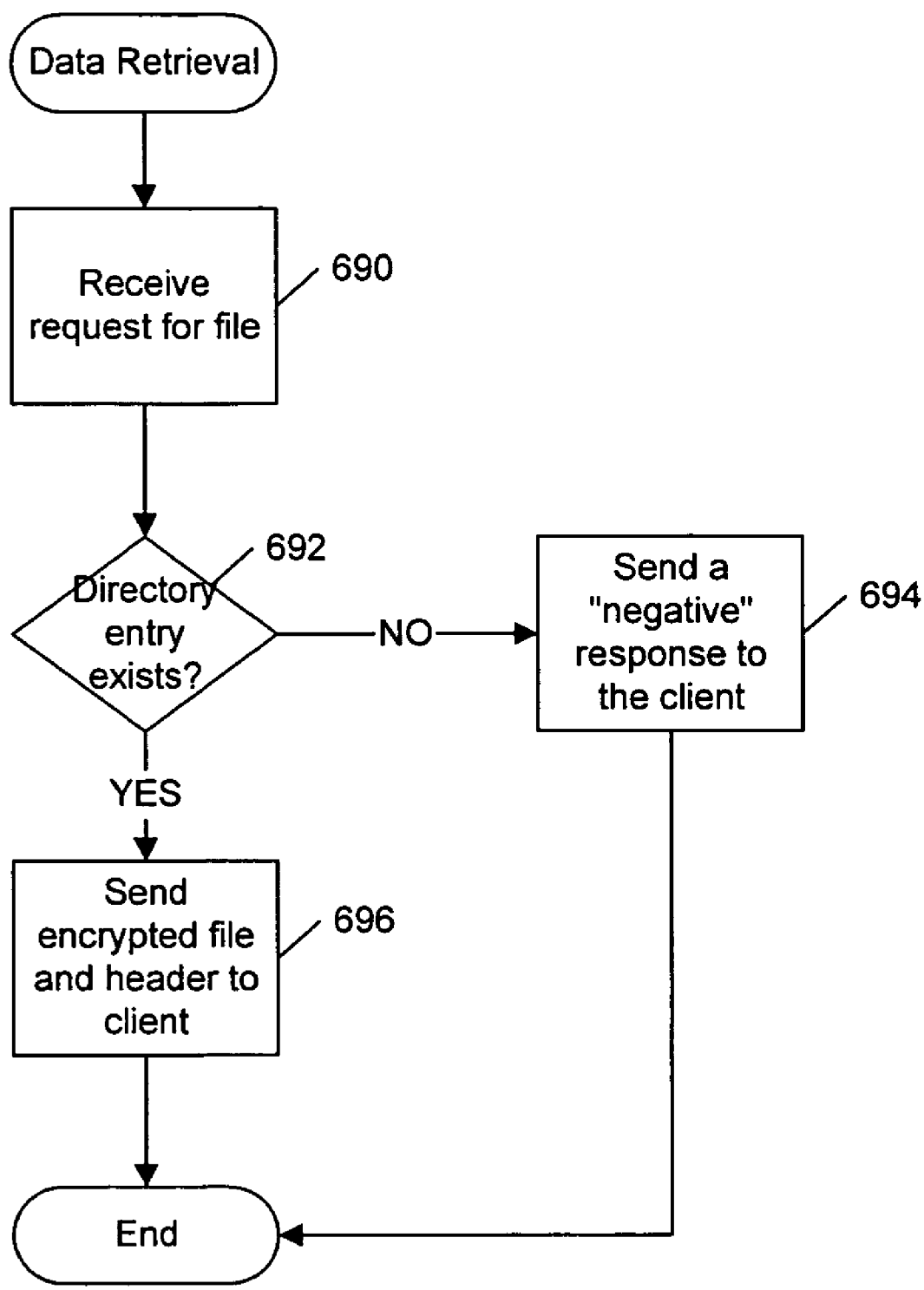
FIG. 8 is a flowchart illustrating operations of a server for retrieving an encrypted file according to embodiments of the present invention.
Figure 9:
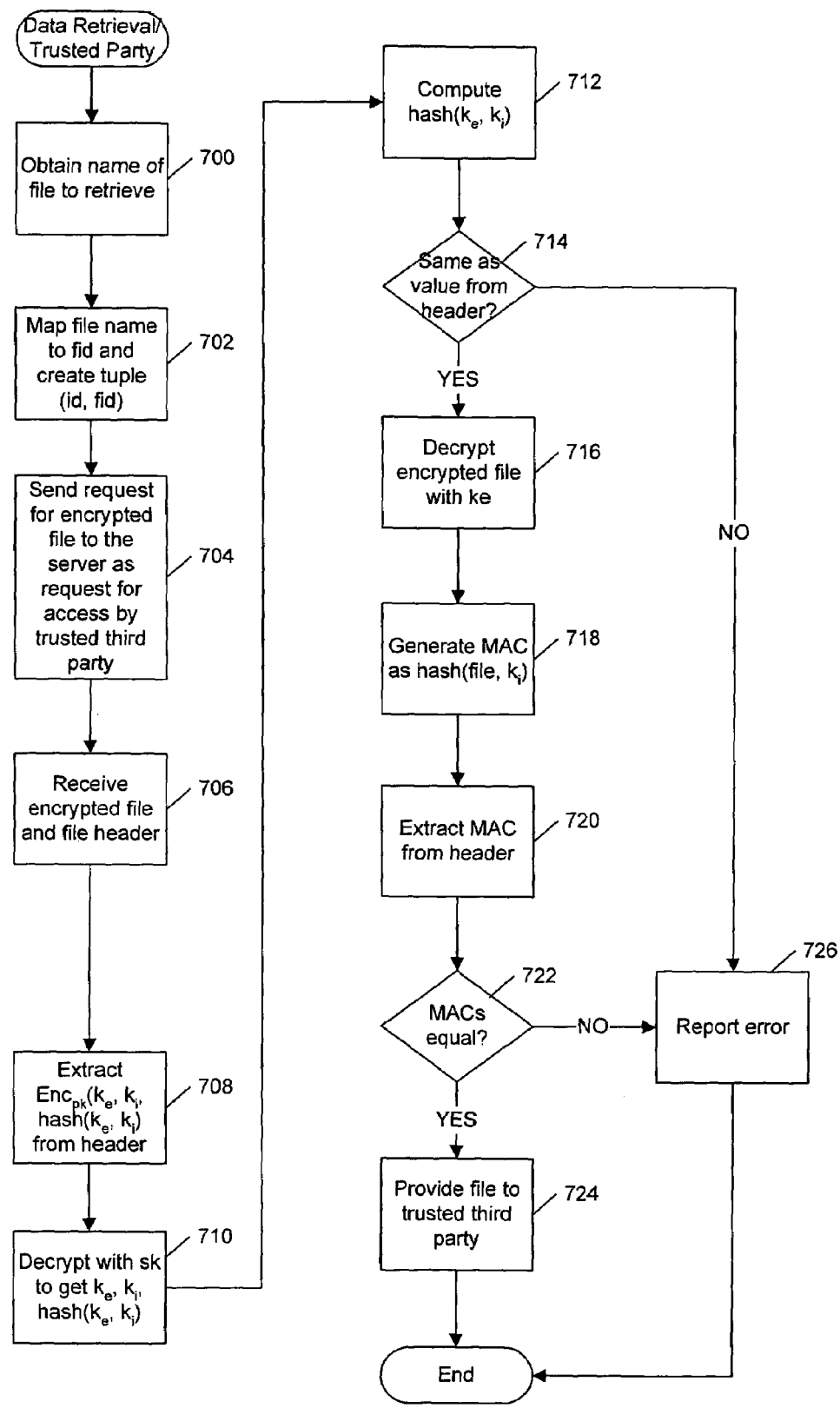
FIG. 9 is a flowchart illustrating operations of a client of a trusted third party associated with a file for retrieving an encrypted file according to embodiments of the present invention.

Operations for data retrieval will now be described with reference to FIGS. 7 through 9. FIG. 7 illustrates operations of the personal key client for data retrieval by the file owner. FIG. 8 illustrates operations of the file server for data retrieval by the file owner or by a trusted third party. FIG. 9 illustrates operations for data retrieval by a trusted third party. As seen in FIGS. 7 through 9, a file stored on a file server may be retrieved and recovered by a user with access rights such as the file owner or a trusted third party. Note that a trusted third party can only recover the file if the "file recovery by a trusted third party" option was selected when the file was stored on the file server.

Turning to FIG. 7, when a user wants to retrieve and decrypt a file stored on the file server, the user submits their userid (id) and password/passphrase (pw) to the personal key client (block 650). The user also requests access to a named file (corresponding to a fid) stored on the file server (block 652) by, for example, either specifying a file name of a fileid. If a file name is specified, the personal key client maps the named file to a file ID (fid) (block 654). In either case, the personal key client sends an "access encrypted file" request, along with the tuple (id, fid), to the file server (block 656). The personal key client then waits to receive the response to the request from the file server.

Turning to FIG. 8, when the file server receives the request to access the encrypted file (block 690), the file server first verifies that a directory entry exists for the tuple (id, fid) received in the "access encrypted file" request (block 692). If so, the file server responds by sending the encrypted file, $Enc_{ke}(file)$, and its associated file header to the personal key client (block 696). If a directory entry does not exist for the tuple (id, fid), then the file server sends a "negative" response message to the personal key client (block 694).

Returning to FIG. 7, when the personal key client receives the response from the file server, if the response is negative, then operations of FIG. 7 may terminate at block 656 and, optionally, the error may be reported to the user. However, if the response provides the encrypted file and file header, the personal key client receives the encrypted file and file header (block 658) and generates a key encrypting key k (block 660). The key encrypting key k may be generated, for example, as follows:

k=Hash(id, pw, fid).

The personal key client extracts the encrypted value (block 662), such as $Enc_k(ke, ki, Hash(ke, ki))$, from the file header and decrypts this value with k to recover the encrypted values (block 664), such as ke, ki and Hash(ke, ki). That is, ke, ki, Hash(ke, ki)=$Dec_k(Enc_k(ke, ki, Hash(ke, ki)))$. The personal key client computes Hash(ke, ki) on the decrypted ke, ki (block 666) if Hash(ke, ki) is provided in the header and compares it with the decrypted value of Hash(ke, ki) to see if they are equal (block 668). If they are equal, then ke and ki are recovered correctly and they have not been changed. If the keys have been recovered correctly, the personal key client decrypts the encrypted file $Enc_{ke}(file)$ with ke (block 670). That is, file=$Dec_{ke}(Enc_{ke}(file))$.

If the hash values are not equal, then an error has occurred and the error may be reported to the user (block 680). Operations would then terminate.

If a MAC is incorporated in the file header, then operations of blocks 672 through 676 may be performed. The personal key client generates a MAC (message authentication code) on the decrypted content of the file with ki (block 672). For example, the MAC may be generated by determining, MAC=Hash(file, ki).

The personal key client checks to see if the MAC that it generated is equal to the MAC that it received in the file header from the file server (block 676). If they are equal, then the file is recovered correctly and its content has not been changed and the contents may be provided to the user (block 678). If the MAC values are not equal, then an error has occurred, the error may be reported to the user (block 680) and operations may terminate.

Turning to FIG. 9, operations for data retrieval by a trusted third party are illustrated. When the trusted third party wants to retrieve and recover a file (fid) associated with a userid id, the trusted third party requests access to a named file (corresponding to a fid) stored on the file server belonging to the file owner whose userid is id by providing, for example, the name of the file to retrieve (block 700) and, possibly, the id of the owner of the file. The personal key client maps the named file to a file ID (fid) (block 702) and creates the tuple (id, fid). The userid utilized to create the tuple may be obtained from the trusted third party or may be stored by the personal key client or the file server. In any event, the personal key client sends an "access encrypted file for trusted third party" request, along with the tuple (id, fid), to the file server (block 704). Operations of the file server in response to the "access encrypted file for trusted third party request" are the same as those illustrated in FIG. 8 and described above with reference to access by the file owner.

When the personal key client receives the response from the file server, if the response is negative, operations of FIG. 9 may terminate at block 704 and, optionally, the error may be reported to the user. However, if the response provides the encrypted file and file header, the personal key client extracts the encrypted value associated with the trusted third party from the header (block 708), for example, $Enc_{pk}(ke, ki, Hash(ke, ki))$. The extracted encrypted value is decrypted with the trusted third party's private key sk to recover the encryption key utilized to encrypt the file (block 710). For example, in the embodiment illustrated in FIG. 9, the values ke, ki and Hash(ke, ki) may be recovered. That is, ke, ki, Hash(ke, ki)=$Dec_{sk}(Enc_{pk}(ke, ki, Hash(ke, ki)))$.

If a hash value is provided, the personal key client computes Hash(ke, ki) on the decrypted ke, ki (block 712) and compares the result with the decrypted value of Hash (ke, ki) to see if they are equal (block 714). If the hash values are equal, then ke and ki are recovered correctly and they have not been changed. The personal key client may then decrypt the encrypted file $Enc_{ke}(file)$ with ke (block 716). That is, file=$Dec_{ke}(Enc_{ke}(file))$.

If the hash values are not equal (block 714), then an error has occurred and this error may, optionally, be reported to the user (block 726) and operations may terminate.

If a MAC is provided in the file header, then the operations of blocks 718 through 722 of FIG. 9 may be performed. The personal key client generates a MAC (message authentication code) on the unencrypted content of the file with ki (block 718). That is, MAC=Hash(file, ki).

The personal key client extracts the MAC from the file header (block 720) and determines if the MAC that it generated is equal to the MAC that it received in the file header from the file server (block 722). If they are equal, then the file is recovered correctly and its content has not been changed. The contents are then provided to the user (block 724). If the MAC values are not equal (block 722), then an error has occurred and this error may, optionally, be reported to the user (block 726) and operations may terminate.

Figure 10:
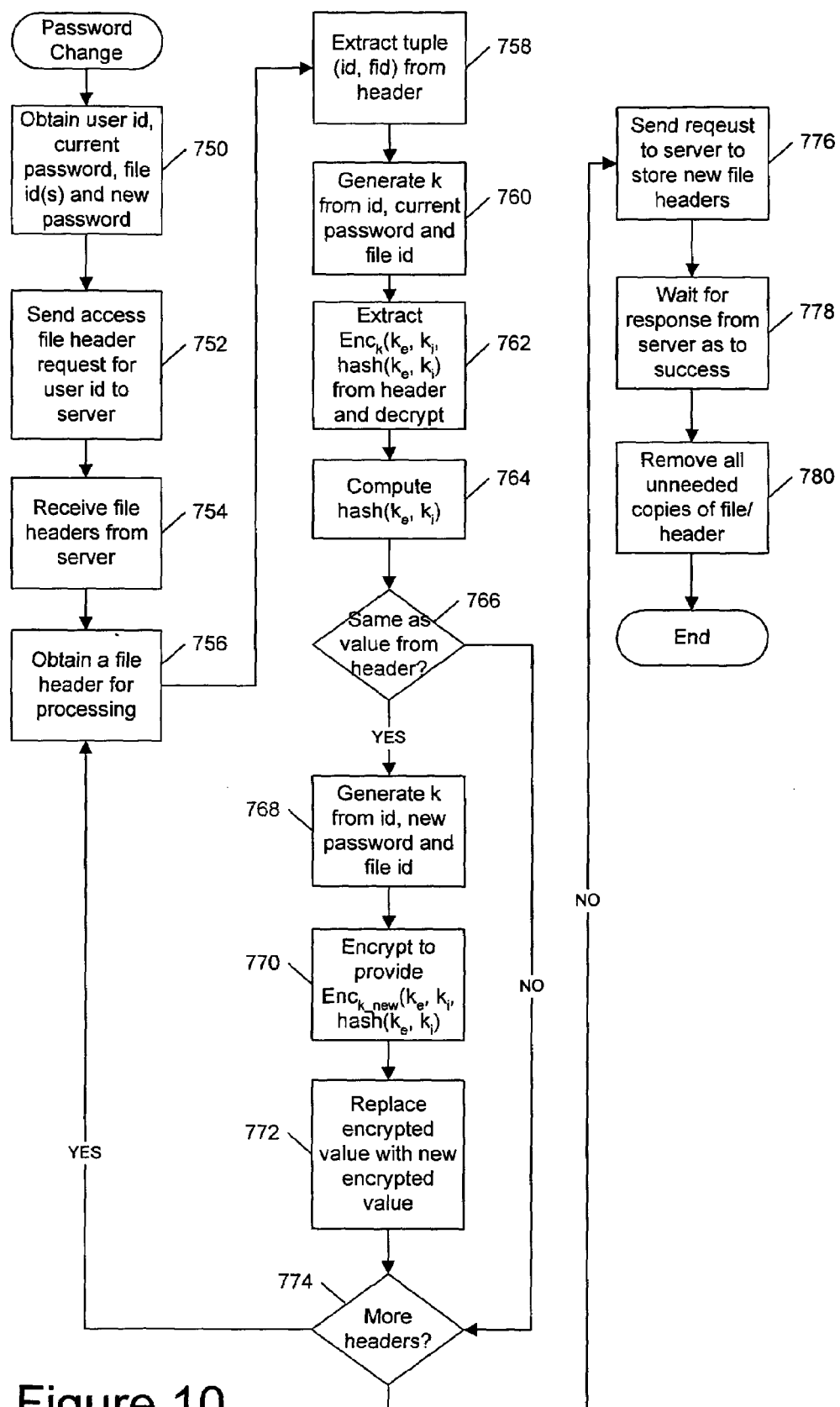
FIG. 10 is a flowchart illustrating operations of a client of an owner of a file for changing a password or passphrase associated with an encrypted file according to embodiments of the present invention.
Figure 11:
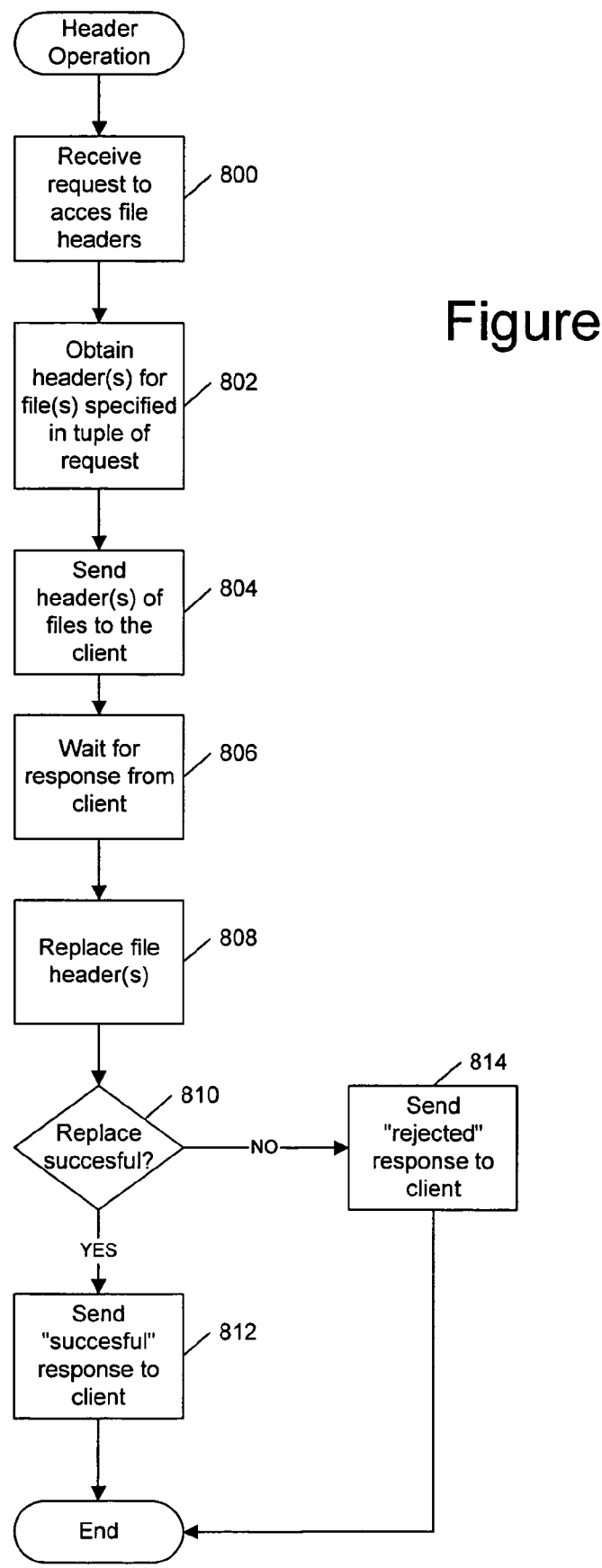
FIG. 11 is a flowchart illustrating operations of a server for changing a password or passphrase associated with an encrypted file according to embodiments of the present invention.
Figure 12:
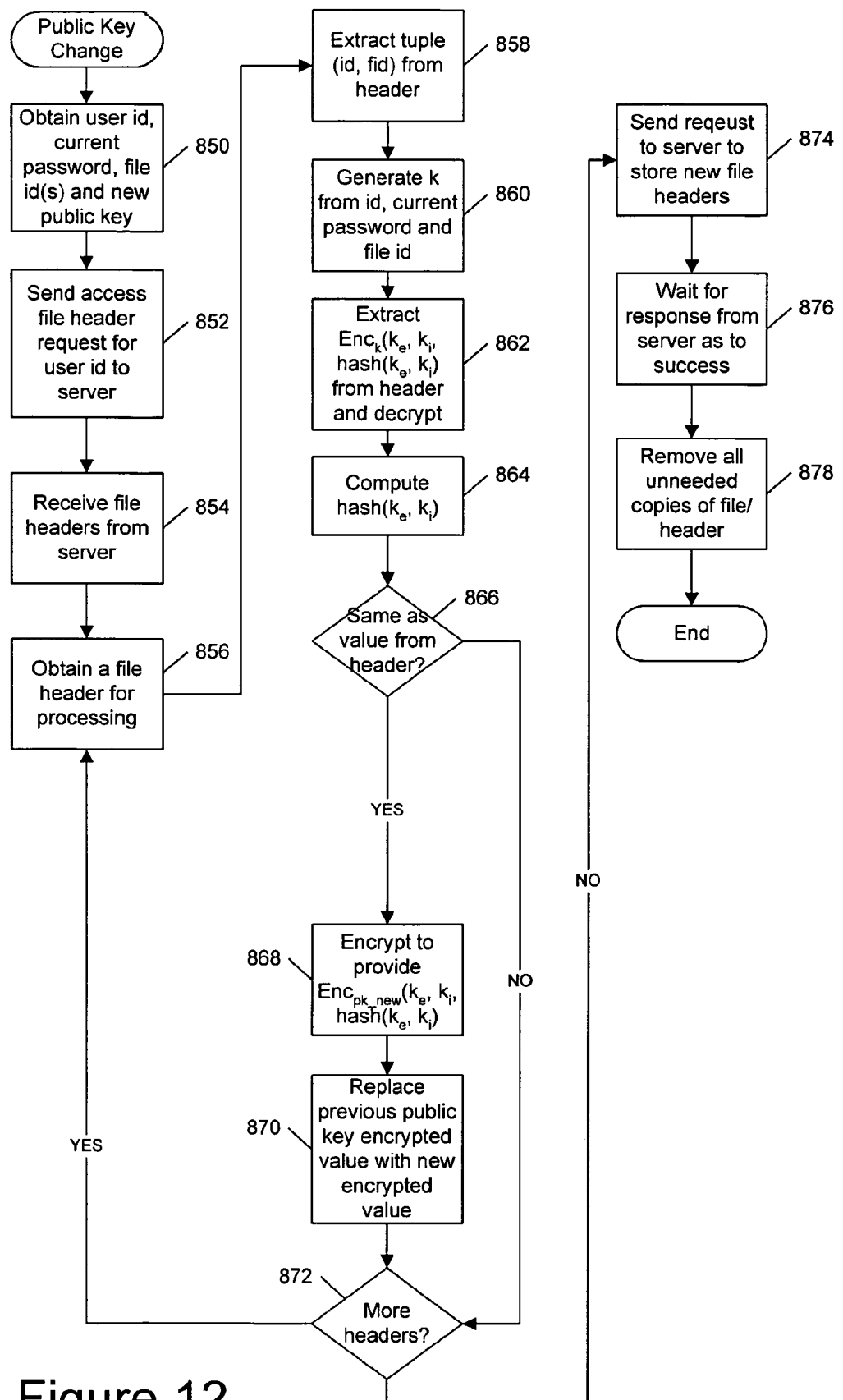
FIG. 12 is a flowchart illustrating operations of a client of an owner of a file for changing a public key of a trusted third party associated with an encrypted file according to embodiments of the present invention.

FIGS. 10, 11 and 12 illustrate operations for changing a password or passphrase for a file and for changing the public key of a trusted third party. FIG. 10 illustrates operations carried out by a personal key client to change a password for a file or files. FIG. 11 illustrates operations of a file server for changing the password/passphrase or the public key of a trusted third party for a file or files. FIG. 12 illustrates operations of a personal key client for changing the public key of a trusted third party.

Turning to FIG. 10, when the user wants to change their current (i.e., old) password/passphrase pw to a "new password/passphrase" new_pw, the personal key client obtains the user's userid (id), current password/passphrase (pw), and new password/passphrase (new_pw) (block 750) by, for example, the user submitting it to the personal key client. The user may also request a password/passphrase change and may specify which file or files are to be changed. Such a specification may be provided by providing the file name or names, fileid or fileids, by providing a wildcard, such as "*" or combination of wildcards, such as "?", and partial file name or fileids which may be utilized as a criteria for selecting the files for which password changes are to be applied. For example, if the wildcard "*" is specified, all files for a given user will have the password changed. Alternatively, because the key for a given file is based on the files password, the "*" designator could change the password for all files with the password pw. In any event, the personal key client sends an "access file headers" request along with the tuple defining the userid and the fileids, for example, (id, *), to the file server (block 752).

As illustrated in FIG. 11, in response to the "access file headers" request (block 800), the file server responds by obtaining the file headers corresponding to the provided tuple, for example, (id, *) (block 802). The file server sends the obtained file headers to the personal key client (block 804) and the file server waits for a response from the personal key client (block 806).

Returning to FIG. 10, the personal key client receives the file header(s) from the file server (block 754) and obtains one of the file headers for processing (block 756). The personal key client extracts the tuple (id, fid) from the file header (block 758) and generates the key encrypting key k (block 760). That is, k=Hash (id, pw, fid).

The personal key client also extracts the encrypted value encrypted with k from the file header (block 762), for example, $Enc_k$(ke, ki, Hash(ke, ki)), and decrypts the encrypted value with k (block 762) to recover the encryption key(s), such as ke, ki and Hash(ke, ki). That is, ke, ki, Hash(ke, ki)=$Dec_k$($Enc_k$(ke, ki, Hash(ke, ki))).

If a hash value is present in the encrypted value, the personal key client also computes Hash(ke, ki) using the decrypted ke, ki (block 764) and compares the computed hash value with the decrypted Hash(ke, ki) to determine if they are equal (block 766). If they are equal, then ke and ki are recovered correctly and they have not been changed. If they are not equal, then processing of the current header is concluded and, if more headers are available for processing (block 774), a next header is obtained (block 756) and processing begins again with block 758. Such an error may also generate a message to a user so as to indicate that the password of the file associated with the file header was not changed and/or that an error occurred processing the header file.

If the hash values are equal, the personal key client generates the new key encrypting key new_k (block 768). That is, new_k=Hash(id, new_pw, fid).

The personal key client encrypts the key values, for example, ke, ki and Hash(ke, ki), with new_k (block 770). That is, $Enc_{new\_k}$(ke, ki, Hash(ke, ki)).

The personal key client replaces the current value of the encrypted keys, such as $Enc_k$(ke, ki, Hash(ke, ki)), in the file header with the new value $Enc_{new\_k}$(ke, ki, Hash(ke, ki)) (block 772). At this point, the personal key client may continue processing additional file headers if any remain (block 774).

If no more file headers remain (block 774), the personal key client sends a "store updated file headers" request to the file server, along with the updated file headers (block 776). The personal key client then waits for a response from the file server (block 778).

Returning to FIG. 11, in response to the "store updated file headers" request (block 806), the file server replaces the appropriate existing file headers with the received new file headers (block 808). If the replacement of file headers was successful (block 810), the file server sends a response message to the personal key client indicating that the file headers have been replaced in the file server's database (block 812). If the replacement is not successful, the file server may respond by rejecting the request and sending a "rejected" response to the personal key client (block 814). Examples of situations which would result in rejection of an "update file headers" request may include a request to update a file header which does not exist or which has been "locked" by the file server.

In any event, when the personal key client receives the response from the file server, operations continue at block 780 of FIG. 10. The personal key client removes all unneeded copies of the file headers from its memory. As with the systems described above, if the file headers are maintained locally, this may involve removing the file headers from working memory. Thus, at block 780, the personal key client deletes all the information associated with this password/passphrase change operation from its memory/storage (i.e., keys, password/passphrase, encrypted information).

FIG. 11 illustrates operations for changing the public key of a trusted third party. The user or personal key client may be informed when the trusted third party changes its public key. For example a server may send a new certificate, containing the new public key, to the user or personal key client. Alternatively, as noted above, these procedures may be utilized to change the third party which is trusted. Thus, for example, if an employee leaves a company, a new trusted third party could be designated by replacing the public key of the former employee with that of a new employee.

However the notification of a change in a public key occurs, the operations of FIG. 12 may be carried out when the public key of a trusted third party is to be changed from a current (i.e., old) public key pk to a "new public key" new_pk. As seen in FIG. 12, the personal key client obtains a userid (id), current password/passphrase (pw), fileid(s) and new public key new_pk (block 850). Such information may be obtained by the user providing some or all of the information to the personal key client and indicating that a public key update is to be performed. As described above, the files for which the public key update may be performed may be specified in any of the various ways described above. The personal key client sends an "access file headers" request along with the tuple, for example, (id, *), to the file server (block 852) and waits to receive the file headers. The file server carries out the operations as described above with reference to FIG. 11 and provides the file headers to the personal key client.

The personal key client receives the file headers (block 854) and obtains a file header for processing (block 856). The personal key client extracts the tuple (id, fid) from the file header (block 858) and generates the key encrypting key k (block 860). That is, k=Hash(id, pw, fid).

The personal key client also extracts the value encrypted with k from the file header, for example, $Enc_k$(ke, ki, Hash(ke, ki)), and decrypts it with k to recover the encryption keys (block 862), for example, ke, ki and Hash(ke, ki). That is, ke, ki, Hash(ke, ki) $Dec_k(Enc_k$(ke, ki, Hash (ke, ki))).

If a hash value is provided with the encrypted key(s), the personal key client computes Hash(ke, ki) using the decrypted ke, ki (block 864) and compares it with the decrypted Hash(ke, ki) to determine if they are equal (block 866). If they are equal, then ke and ki are recovered correctly and they have not been changed. If they are not equal, then processing of the current header is concluded and, if more headers are available for processing (block 872), a next header is obtained (block 856) and processing begins again with block 858. Such an error may also generate a message to a user so as to indicate that the public key of the trusted third party was not changed and/or that an error occurred processing the header file.

If the hash values are equal, the personal key client encrypts the key values, such as ke, ki and Hash(ke, ki), with new_pk (block 868). That is, $Enc_{new\_pk}$(ke, ki, Hash (ke, ki)).

The personal key client replaces the current value of the encrypted keys, such as $Enc_{pk}$(ke, ki, Hash(ke, ki)), in the file header with the new value of the encrypted keys, such as, $Enc_{new\_pk}$(ke, ki, Hash (ke, ki)) (block 870). If there are more headers to process (block 872), then a next header is obtained (block 856) and processing continues at block 858.

If there are no more headers to process, the personal key client sends a "store updated file headers" request to the file server, along with the updated file headers (block 874). Operations of the file server are carried out as described above with reference to FIG. 11 and the personal key client waits for a response from the file server (block 876). When the personal key client receives the response from the file server, operations continue at block 878 of FIG. 12. The personal key client removes all unneeded copies of the file headers from its memory. As with the systems described above, if the file headers are maintained locally, this may involve removing the file headers from working memory. Thus, at block 878, the personal key client deletes all the information associated with this password/passphrase change operation from its memory/storage (i.e., keys, password/passphrase, encrypted information).

While the operations of FIGS. 10, 11 and 12 are illustrated as being performed in a batch operation, such operations could also be performed on a header by header basis. In such embodiments, the each header to be changed could be obtained, modified and then stored on the file server. Thus, the present invention should not be construed as limited to the particular operations illustrated in FIGS. 10 through 12.

The flowcharts and block diagrams of FIGS. 1 through 12 illustrate the architecture, functionality, and operation of possible implementations of systems, methods and computer program products for securing stored digital data. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling access to digital data in a file comprising:
   obtaining a passphrase from a user;
   generating a personal key based on the obtained passphrase;
   generating a file encryption key;
   encrypting the digital data in the file with the file encryption key to provide an encrypted file;
   encrypting the file encryption key with the personal key to provide an encrypted file encryption key;
   creating a file header containing the encrypted file encryption key;
   associating the file header with the encrypted file;
   obtaining a user identification associated with an owner of the file;
   obtaining a file identification associated with the file; and
   wherein the step of generating a personal key based on the obtained passphrase comprises the step of hashing the user identification, the passphrase and the file identification to provide the personal key.

2. A method according to claim 1, further comprising the step of storing the file and the associated file header at a file server.

3. A method according to claim 2, wherein the step of storing the file and the associated file header at a file server comprises the step of selectively storing the file and the file header based on a type of store requested by the user and an evaluation of whether an existing file and file header having the user identification and file identification are stored at the file server.

4. A system for controlling access to digital data in a file comprising:
   means for obtaining a passphrase from a user;
   means for generating a personal key based on the obtained passphrase;
   means for generating a file encryption key;
   means for encrypting the digital data in the file with the file encryption key to provide an encrypted file;
   means for encrypting the file encryption key with the personal key to provide an encrypted file encryption key;

means for creating a file header containing the encrypted file encryption key;

means for associating the file header with the encrypted file;

means for obtaining a user identification associated with an owner of the file;

means for obtaining a file identification associated with the file; and wherein the means for generating a personal key based on the obtained passphrase comprises means for hashing the user identification, the passphrase and the file identification to provide the personal key.

5. A system according to claim 4, further comprising means for storing the file and the associated file header at a file server.

6. A system according to claim 5, wherein the means for storing the file and the associated file header at a file server comprises means for selectively storing the file and the file header based on a type of store requested by the user and an evaluation of whether an existing file and file header having the user identification and file identification are stored at the file server.

7. A computer program product for controlling access to digital data in a file comprising:

a computer readable storage medium having computer readable program code embodied therein, the computer readable program code comprising:

computer readable program code which obtains a passphrase from a user;

computer readable program code which generates a personal key based on the obtained passphrase;

computer readable program code which generates a file encryption key;

computer readable program code which encrypts the digital data in the file with the file encryption key to provide an encrypted file;

computer readable program code which encrypts the file encryption key with the personal key to provide an encrypted file encryption key;

computer readable program code which creates a file header containing the encrypted file encryption key; and computer readable program code which associates the file header with the encrypted file;

computer readable program code which obtains a user identification associated with an owner of the file;

computer readable program code which obtains a file identification associated with the file; and wherein the computer readable program code which generates a personal key based on the obtained passphrase comprises computer readable program code which hashes the user identification, the passphrase and the file identification to provide the personal key.

8. A computer program product according to claim 7, further comprising computer readable program code which stores the file and the associated file header at a file server.

9. A computer program product according to claim 8, wherein the computer readable program code which stores the file and the associated file header at a file server comprises computer readable program code which selectively stores the file and the file header based on a type of store requested by the user and an evaluation of whether an existing file and file header having the user identification and file identification are stored at the file server.

* * * * *